May 18, 1965  C. R. HERRING  3,183,919
BREAKAWAY VALVE FOR VEHICLE BRAKE SYSTEMS
Filed May 29, 1963

INVENTOR.
CLARENCE ROY HERRING
BY
ATTORNEYS

United States Patent Office 3,183,919
Patented May 18, 1965

3,183,919
BREAKAWAY VALVE FOR VEHICLE
BRAKE SYSTEMS
Clarence R. Herring, La Habra, Calif. (% Scalco Airbrakes Inc., 13530 Nelson Ave., City of Industry, Calif.)
Filed May 29, 1963, Ser. No. 284,176
2 Claims. (Cl. 137—102)

This invention relates to breakaway valves for vehicle brake systems. Safety regulations concerning towing vehicles and brake-equipped trailers, operating not only in interstate commerce but also within many states, require that in the event of a trailer breakaway the brakes on the towing vehicle remain operative. Also safety regulations require that the emergency features of the trailer brakes be automatically operated in the event of reduction of the towing vehicle air supply to some predetermined minimum pressure, and in addition that a manually-controlled device readily operated by the driver be provided which will also effect operation of the emergency features of the trailer brakes.

Included in the objects of this invention are:

First, to provide a breakaway valve which accomplishes in a dependable and facile manner the reqiurements of the safety regulations above outlined.

Second, to provide a breakaway valve which automatically shuts off air supply to the trailer, if the air pressure in the towing vehicle should drop to an unsafe level, and simultaneously bleeds any remaining air pressure from the pressure supply line on the trailer, so as to cause operation of conventional automatic safety devices arranged to cause the trailer brakes to set. Simultaneously, the breakaway valve closes off the service brake application line to the trailer to prevent further loss of air pressure from the towing vehicle. In addition, by operation of the dashboard manual control valve, the breakaway valve may be operated at will, regardless of the pressure in the braking system.

Third, to provide a breakaway valve which is interposed in both the application line and pressure supply line, and is so arranged that as long as the manual control valve is in its normal position, the pressure in the supply line is within its normal range, and the connections to the trailer are functioning, both the application line and pressure supply line are open through the breakaway valve so that the breakaway valve does not in any way interfere with normal operation of the brakes.

Fourth, to provide a breakaway valve which is automatically restored to its normal position, permitting flow through the application line and pressure supply line when the braking system is restored to its normal condition.

Fifth, to provide a breakaway valve which cannot be overridden or rendered inoperative by driver manipulation of the manual control valve, should the driver attempt to nullify the function of the breakaway valve.

Sixth, to provide a breakaway valve which has only one moving assembly which is easily and quickly replaced so as to minimize service time.

Seventh, to provide a breakaway valve which may be readily installed in existing brake systems and which does not require extra piping and fittings.

With the above and other objects in view, as may appear hereinafter, reference is directed to the accompanying drawings in which.

Figure 1:
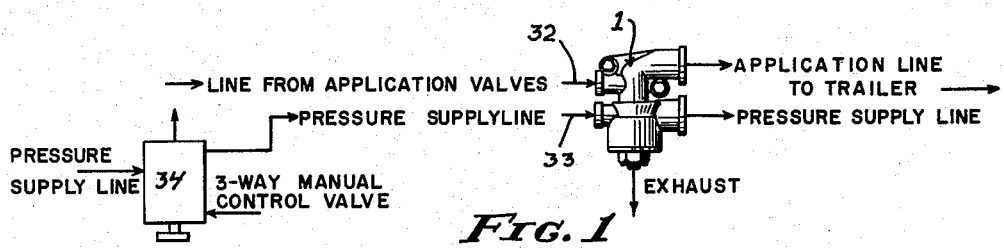
FIGURE 1 is a diagrammatical view showing the relationship of the breakaway valve to the application line and pressure supply line of a towing vehicle.

The breakaway valve for vehicle brake systems includes a valve body 1 having suitable mounting holes 2 for attachment at an appropriate location to the frame of a towing vehicle. The valve body 1 is provided with a longitudinal bore having a reduced portion which forms an application line valve chamber 3 and an enlarged or counterbored portion forming a pressure supply line valve chamber 4.

The axial inner end of the chamber 3 is further reduced in diameter to form an application line port 5 and a shoulder which forms a valve seat. The port 5 communicates with an application line outlet 6. The side wall of the chamber 4 adjacent the port 5 is provided with an application line inlet 7.

The pressure supply line valve chamber 4 is intersected adjacent its axially inner end by a pressure line inlet 8. The valve body 1 is further enlarged at the axially outer end of the chamber 4 to form an annular channel 9. The axially outer portion of the walls of the chamber 4 form an annular lip 10 surrounded by the channel 9. The channel 9 communicates with a pressure supply line outlet 11.

The annular lip 10 is provided with relatively narrow and short axial grooves 12, and the walls of the chamber 4 form between the grooves 12 a ring of lands which support an O-ring, as will be described hereinafter.

Beyond the annular channel 9 the valve body 1 is internally screw-threaded to receive an externally screw-threaded exhaust cap 13. A gasket 14 seals the screw-threaded connection between the cap 13 and the valve body 1. The exhaust cap 13 is provided with a bore 15 equal in diameter to the chamber 4, and in fact forms a continuation thereof.

The inner end of the exhaust cap 13 forms an annular lip 16 which confronts the annular lip 10 and defines therewith a narrow annular slit. In addition, the annular lip 16 is provided with narrow axial grooves 17, corresponding to the axial grooves 12.

The outer end of the exhaust cap 13 is provided with a ring of exhaust ports 18, the outer or discharge ends of which are covered by a yieldable check valve washer 19 held in place by a screw 20.

The valve body 1 and exhaust cap 13 receive a valve plunger 21 which includes an application valve portion 22 of reduced diameter adapted to fit slidably in the application line valve chamber 3. The application valve portion 22 is provided with an O-ring 23 which at all times isolates the application valve chamber 3 from the pressure valve line chamber 4.

The axially inner end of the application valve portion 22 is provided with a valve seal 24 in the form of an elastomer bonded to the valve plunger 21. The seal 24 engages the valve seat surrounding the application line port 5.

The valve plunger 21 also includes an enlarged end which forms a pressure supply line valve portion 25, and is provided with spaced O-rings 26 and 27 separated by an annular chamber 28.

The axially outer end of the valve plunger 21 is provided with a socket 29 which receives a spring 30 adapted to bear against the exhaust cap 13. The exhaust cap is provided with a recess 31 to receive and center the spring 30.

Operation of the breakaway valve for vehicle brake systems is as follows:

The breakaway valve is installed in both an application line 32 and a pressure supply line 33 of a towing vehicle as shown in FIGURE 1. A manual control valve 34, which in itself is conventional, is installed in the pressure supply line 33 upstream of the breakaway valve.

The manual control valve 34 is a three-way valve arranged, when in its normal position, to permit flow of pressure fluid through the pressure supply line 33 to the breakaway valve. The manual control valve 34 is movable manually to a second position in which pressure fluid in the pressure supply line 33 is exhausted to atmosphere.

Figure 3:
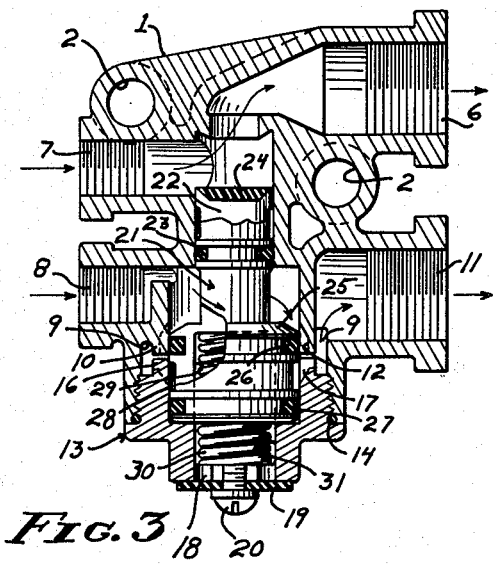
FIGURE 3 is a similar longitudinal, sectional view of the breakaway valve shown in its open or normal condition when the brakes of the trailer are functioning.
Figure 4:
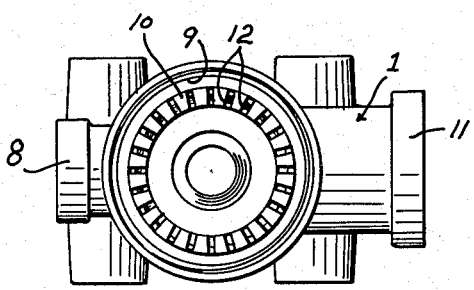
FIGURE 4 is an end view of the breakaway valve with the exhaust cap removed.
Figure 5:
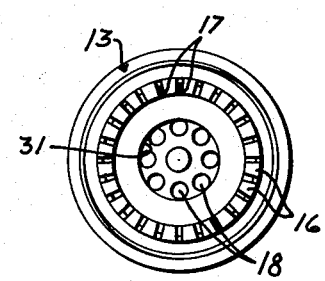
FIGURE 5 is an end view of the exhaust cap separated from the valve body.

When the manual control valve 34 is in its normal position and the pressure in the brake system is within its safe range, and also when the brake system of the trailer is joined to the application line 32 and pressure supply line 33 of the towing vehicle, the breakaway valve is in its open position shown in FIGURE 3. The breakaway valve is held in its open position by the pressure in the pressure supply line 33 acting on the pressure supply line valve portion 25, which is larger than the area of the application valve portion 22.

When the breakaway valve is in its open position shown in FIGURE 3, the O-ring 26 rests on the lands formed between the axial grooves 12 so that the pressure fluid may flow through the breakaway valve to the trailer. The O-ring 27 is disposed beyond the axial grooves 17 so as to close the exhaust ports 18. In addition, when the valve plunger 21 is in the position shown in FIGURE 3, the application valve portion 22 permits flow from the application line inlet 7 to the application line outlet 6 and on to the trailer.

The force exerted by the pressure fluid against the valve plunger 21 is in opposition to the spring 30. Should the pressure in the pressure supply line 33 diminish below a safe value, the spring 30 forces the valve plunger 21 from the position shown in FIGURE 3 to the position shown in FIGURE 2. When this occurs, the valve seal 24 closes the application line port 5.

Simultaneously, the O-ring 27 moves on to the lands between the axial grooves 17 so that pressure fluid in the pressure supply line 33 downstream, that is toward the trailer with respect to the breakaway valve, exhausts through the exhaust ports 18. The O-ring 26 seals the pressure supply line upstream from the breakaway valve.

Figure 2:
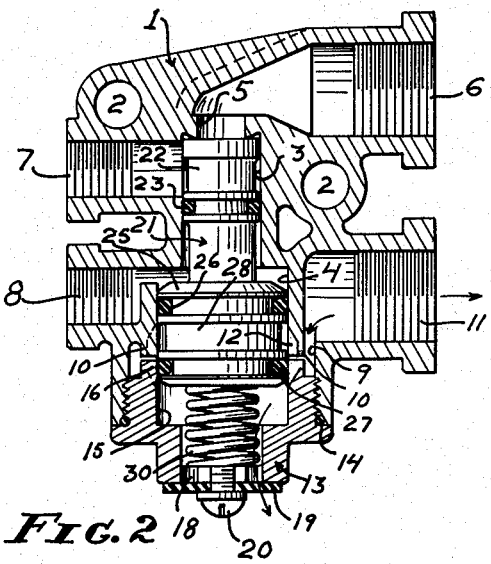
FIGURE 2 is a longitudinal, sectional view of the breakaway valve shown in its closed position in which the application line and pressure supply line to the trailer are closed.

Movement of the breakaway valve from the position shown in FIGURE 3 to the position shown in FIGURE 2 may occur under three conditions: First, if the trailer should breakaway from the towing vehicle; second, if the pressure in the pressure supply line 33 should drop to an unsafe value; third, should the driver manually operate the control valve 34 to exhaust the pressure supply line. In each of these cases loss of pressure in the application line 32 and pressure supply line 33 upstream of the breakaway valve operates conventional automatic devices to set the brakes of the trailer. At the same time the application line in the towing vehicle is sealed so that its brakes may be operated in a normal manner.

It will be noted that in the installation of the breakaway valve no extra lines are required, that is, it is merely necessary to place the manual valve in the existing pressure line upstream of the breakaway valve.

It will also be noted that by merely removing the exhaust cap 13, the valve plunger 21 may be removed and a new plunger substituted, all without disturbing the application and pressure supply lines.

It will also be noted that with the arrangement of the axial grooves 12 and 17 and the supporting lands therebetween that the O-rings 26 and 27 may be safely moved between their sealing positions and their positions in which air may by-pass. That is, flow of air through the grooves 12 and 17 in no way adversely affects the O-rings 26 and 27.

While a particular embodiment of this invention has been shown and described, it is not intended to limit the same to the exact details of the construction set forth, and it embraces such changes modifications, and equivalents of the parts and their formation and arrangement as come within the purview of the appended claims.

What is claimed is:

1. A breakaway valve adapted for installation on an application line and a pressure supply line of a vehicle brake system, said breakaway valve comprising:
   (a) a valve body structure having a bore defining an application line valve chamber of minor diameter, and a pressure supply line valve chamber of major diameter;
   (b) inlets and outlets for said respective valve chambers;
   (c) an exhaust port communicating with said pressure supply line valve chamber;
   (d) a ring of axially directed slits formed in the side walls of said pressure supply line valve chamber for communication with said pressure supply line chamber outlet, and seal rings supporting lands formed between said slits;
   (e) a valve plunger including a minor valve portion fitting said application line valve chamber and isolating said chamber from said pressure supply line valve chamber, and a major valve portion fitting said pressure supply line valve chamber and normally closing communication between the pressure supply line chamber inlet and outlet;
   (f) said valve plunger including a pair of seal rings movable over said lands constructed and arranged for communication between said pressure supply line chamber outlet and either said pressure supply line chamber inlet or said exhaust port;
   (g) said valve plunger being movable in response to pressure at said pressure supply line chamber inlet to cause said minor valve portion to open communication between said application line chamber inlet and outlet, and said major valve portion to open said pressure supply line chamber inlet and outlet and close said exhaust port;
   (h) and yieldable means operable on drop in pressure at said pressure supply line chamber inlet to cause closure of said application line chamber valve and said pressure supply line chamber valve, to close and to open communication between said pressure supply line chamber outlet and said exhaust port.

2. A breakaway valve adapted for installation on an application line and a pressure supply line of a vehicle brake system, said breakaway valve comprising:
   (a) a valve body defining an inner bore forming a valve chamber of minor dimension, and an outer bore forming a chamber portion of major diameter;
   (b) a cap covering said outer bore and having a portion forming a continuation of said major diameter chamber portion and having an exhaust port in the end thereof, said portions forming a major chamber;
   (c) said major chamber having a ring of slits in its side walls intermediate its ends and seal-supporting lands between said slits;
   (d) an outlet communicating with said major chamber through said slits;
   (e) an inlet communicating with said major chamber at its end opposite from said exhaust port;
   (f) a side inlet and an end outlet for said minor chamber;
   (g) the inlet and outlet for said minor chamber being adapted for connection to an application line, and the inlet and outlet for said major chamber being adapted for connection to a pressure supply line;
   (h) a valve plunger including a minor diameter valve portion fitting said minor diameter chamber and a major diameter valve portion fitting said major diameter chamber;
   (i) said valve plunger being movable and constructed and arranged to open and close communication between the inlet and outlet of said chamber of minor dimension and said major chamber in unison;

(j) said valve plunger including seal means movable over said lands and constructed and arranged to effect communication of said pressure supply line chamber outlet with said exhaust port, when communication between said inlets and outlets is precluded, thereby to bleed fluid from said supply line chamber outlet;

(k) means formed by said plunger and said major chamber to establish a pressure area subject to pressure in said supply line chamber inlet for holding said pressure supply valve and said pressure application valve open;

(l) and yieldable means for closing communication between the inlet and outlet of the chamber of minor dimension when the pressure in said pressure supply line chamber falls below a predetermined value.

References Cited by the Examiner

UNITED STATES PATENTS

| | | | |
|---|---|---|---|
| 1,257,070 | 2/18 | Discher | 137—87 XR |
| 2,248,850 | 7/41 | Campbell | 137—107 XR |
| 2,858,763 | 11/58 | Fites | 137—102 |

FOREIGN PATENTS 622,904  1949  Great Britain.

ISADOR WEIL, *Primary Examiner*.